United States Patent
Son et al.

(10) Patent No.: US 10,613,910 B2
(45) Date of Patent: *Apr. 7, 2020

(54) VIRTUAL ARCHITECTURE GENERATING APPARATUS AND METHOD, AND RUNTIME SYSTEM, MULTI-CORE SYSTEM AND METHODS OF OPERATING RUNTIME SYSTEM AND MULTI-CORE SYSTEM

(71) Applicant: SAMSUNG ELECTRONICS CO., LTD., Suwon-si (KR)

(72) Inventors: Min Young Son, Yongin-si (KR); Shi Hwa Lee, Seoul (KR); Seung Won Lee, Hwaseong-si (KR); Jeong Joon Yoo, Hwaseong-si (KR); Jae Don Lee, Paju-si (KR); Young Sam Shin, Hwaseong-si (KR); Hee Jin Ahn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

This patent is subject to a terminal disclaimer.

(21) Appl. No.: 15/646,747

(22) Filed: Jul. 11, 2017

(65) Prior Publication Data

US 2017/0308410 A1    Oct. 26, 2017

Related U.S. Application Data

(63) Continuation of application No. 13/438,205, filed on Apr. 3, 2012, now Pat. No. 9,703,612.

(30) Foreign Application Priority Data

Oct. 27, 2011  (KR) .................... 10-2011-0110465

(51) Int. Cl.
*G06F 9/50*   (2006.01)
*G06F 11/34*  (2006.01)
(Continued)

(52) U.S. Cl.
CPC ............ *G06F 9/5088* (2013.01); *G06F 8/447* (2013.01); *G06F 9/45558* (2013.01); *G06F 11/3466* (2013.01); *G06F 2009/4557* (2013.01)

(58) Field of Classification Search
CPC .... G06F 9/5088; G06F 9/45558; G06F 8/447; G06F 11/3466; G06F 2009/4557
See application file for complete search history.

(56) References Cited

U.S. PATENT DOCUMENTS 7,774,191 B2   8/2010  Berkowitz et al.
8,028,290 B2 * 9/2011  Rymarczyk ......... G06F 9/30181
                                            712/16
(Continued)

FOREIGN PATENT DOCUMENTS

EP   1349092 A2 * 10/2003 ......... G06F 17/5022
EP   2090983 A1    8/2009
(Continued)

OTHER PUBLICATIONS

So et al., "A Compiler approach to Fast Hardware Design Space Exploration in FPGA-based Systems", PLDI'02, Jun. 17-19, 2002 (Year: 2002).*

*Primary Examiner* — Francisco J Aponte
*Assistant Examiner* — Kevin X Lu
(74) *Attorney, Agent, or Firm* — Sughrue Mion, PLLC

(57) ABSTRACT

A virtual architecture generating apparatus and method, a runtime system, a multi-core system, and methods of operating the runtime system and the multi-core system may include analyzing a requirement of an application, a feature of the application, and a requirement of a system enabling an execution of the application, and include generating a virtual architecture corresponding to the application, based on a physical architecture of a reconfigurable processor, the analyzed requirements and the analyzed feature.

14 Claims, 11 Drawing Sheets

(51) Int. Cl.
　　　　*G06F 8/41*　　　　(2018.01)
　　　　*G06F 9/455*　　　(2018.01)

(56) References Cited

U.S. PATENT DOCUMENTS

|              |     |         |                              |
|--------------|-----|---------|------------------------------|
| 8,205,066    | B2  | 6/2012  | Brewer et al.                |
| 8,230,425    | B2* | 7/2012  | Ahuja .................. G06F 9/5044 |
|              |     |         | 712/200                      |
| 8,489,925    | B1  | 7/2013  | Antukh et al.                |
| 8,677,329    | B2  | 3/2014  | Beretta et al.               |
| 2003/0041312 | A1* | 2/2003  | Fueki .................. G06F 15/7867 |
|              |     |         | 717/100                      |
| 2006/0080638 | A1  | 4/2006  | Fiore                        |
| 2007/0055958 | A1  | 3/2007  | Birenheide et al.            |
| 2007/0294337 | A1  | 12/2007 | Gaos et al.                  |
| 2008/0077382 | A1  | 3/2008  | Strehl                       |
| 2008/0184211 | A1  | 7/2008  | Nickolls et al.              |
| 2010/0138828 | A1  | 6/2010  | Hanquez et al.               |
| 2013/0036408 | A1  | 2/2013  | Auerbach et al.              |
| 2013/0080805 | A1  | 3/2013  | Vick et al.                  |
| 2013/0091568 | A1* | 4/2013  | Sharif .................... G06F 21/50 |
|              |     |         | 726/22                       |
| 2013/0157639 | A1  | 6/2013  | Huppenthal et al.            |
| 2013/0227535 | A1  | 8/2013  | Kannan                       |
| 2018/0300165 | A1* | 10/2018 | Johnson .................. H04L 67/34 |

FOREIGN PATENT DOCUMENTS

| KR | 10-0368347      | 1/2003  |
|----|-----------------|---------|
| KR | 10-2006-0079088 | 7/2006  |
| KR | 10-2007-0110168 | 11/2007 |
| KR | 10-2010-0070901 | 6/2010  |

\* cited by examiner

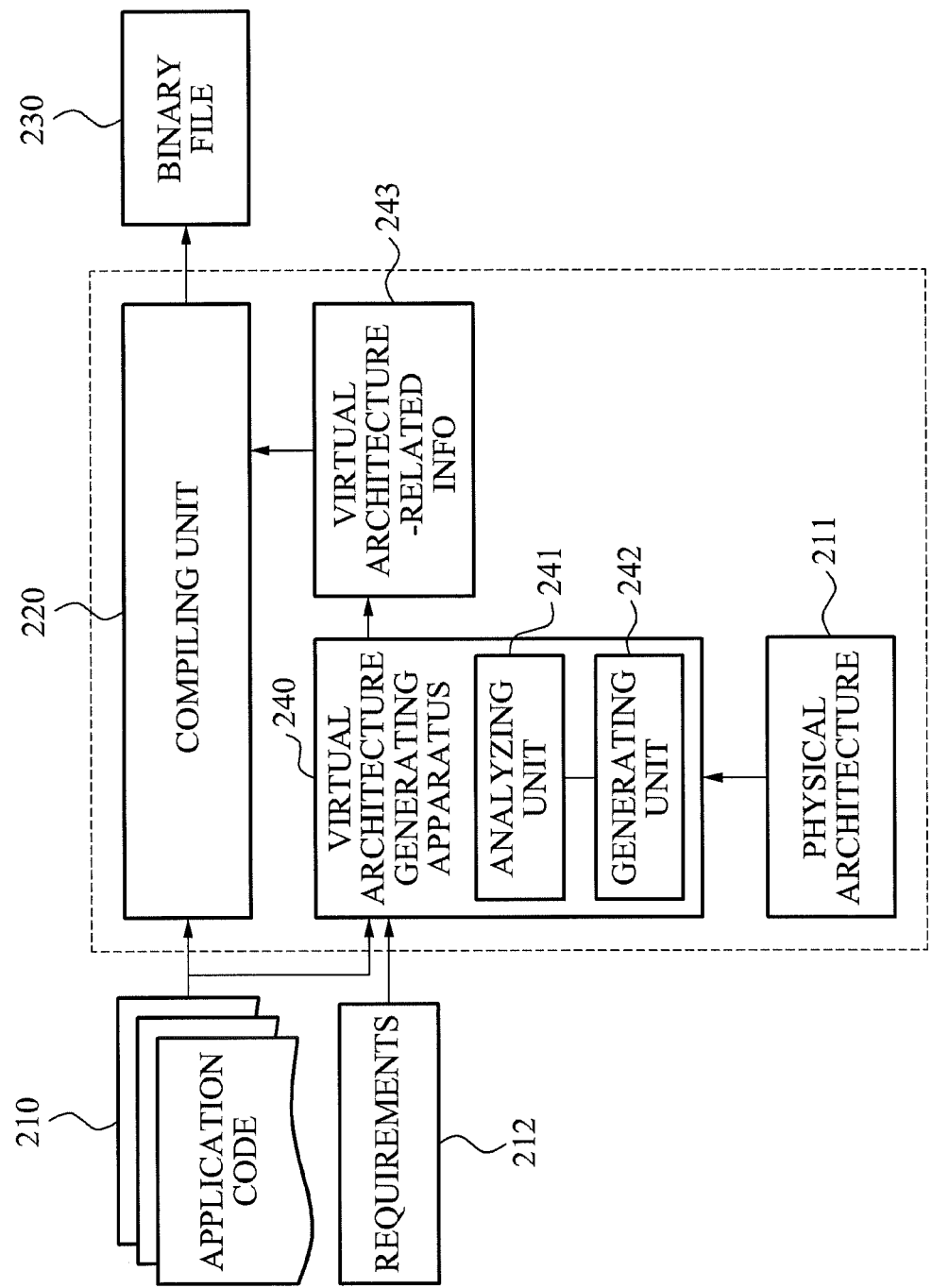

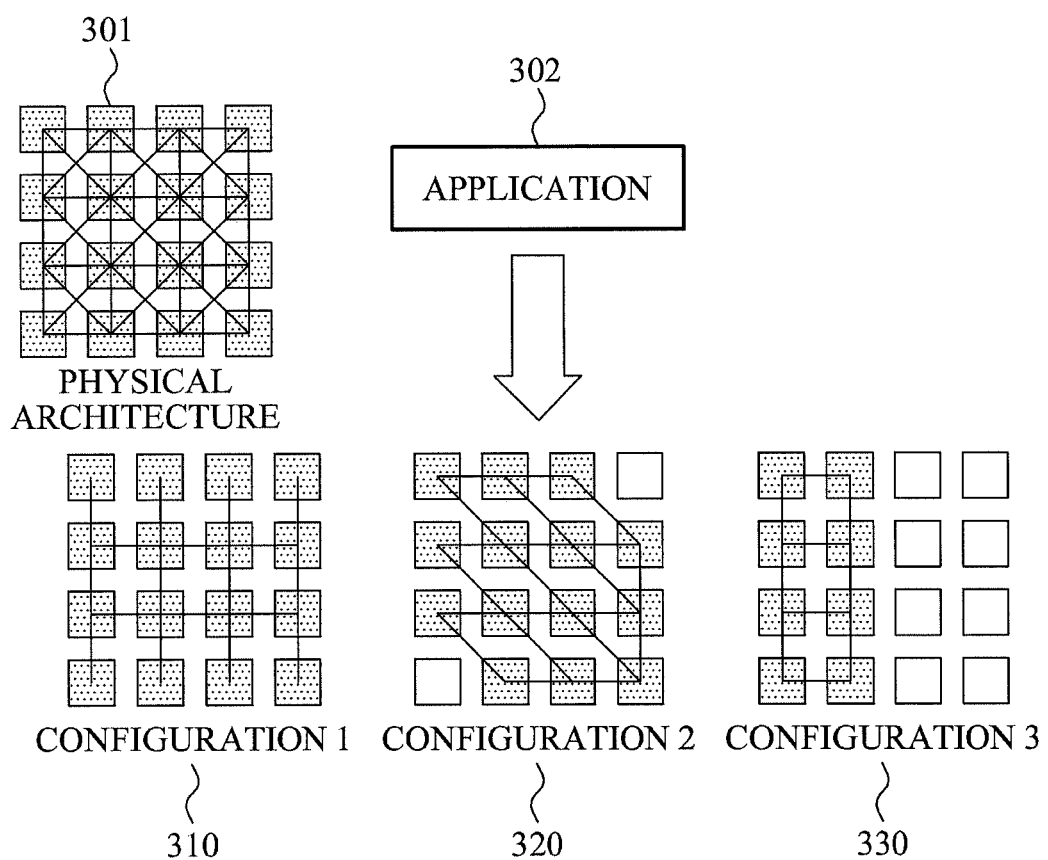

400

VIRTUAL ARCHITECTURE GENERATING APPARATUS AND METHOD, AND RUNTIME SYSTEM, MULTI-CORE SYSTEM AND METHODS OF OPERATING RUNTIME SYSTEM AND MULTI-CORE SYSTEM

CROSS-REFERENCE TO RELATED APPLICATIONS

This is a continuation application of U.S. application Ser. No. 13/438,205 filed Apr. 3, 2012, now U.S. Pat. No. 9,703,612, issued Jul. 11, 2017, which claims the benefit of Korean Patent Application No. 10-2011-0110465, filed on Oct. 27, 2011, in the Korean Intellectual Property Office, the disclosures of which are incorporated herein by reference.

BACKGROUND

1. Field

One or more example embodiments of the following description relate to an apparatus and method for generating a virtual architecture, and a runtime system and a multi-core system that are operated based on a virtual architecture.

2. Description of the Related Art

A configuration of a reconfigurable processor used by an existing application is determined by a compiler. Conventionally, a binary file associated with an application is generated based on the same physical architecture as a hardware configuration of a processor.

However, since the complexity of generating the binary file is greatly increased based on a range of hardware of the reconfigurable processor, it is difficult to find an optimal solution, and a long period of time is required. Additionally, developers have less room to directly intervene, and the compiler needs to determine both which hardware is used by a corresponding application, and how the hardware works.

FIG. 1 is a diagram of an existing method of configuring an application in a conventional reconfigurable processor.

Referring to FIG. 1, conventionally, a compiler 120 receives an input of an application code 110 of an application, receives a full hardware description 111 of a reconfigurable processor (namely, a physical architecture 111 of the reconfiguration processor), and generates a binary file 130 associated with the application. In other words, the compiler 120 entirely generates the binary file 130, with all available resources of the reconfigurable processor.

SUMMARY

The foregoing and/or other aspects may be achieved by providing a method of generating a virtual architecture of a reconfigurable processor so that the virtual architecture corresponds to an application, in which the method may include analyzing a requirement of the application, a requirement of a system, and a feature of the application, the system enabling an execution of the application, and generating the virtual architecture corresponding to the application, based on a physical architecture of the reconfigurable processor, the analyzed requirements and the analyzed feature.

The foregoing and/or other aspects may be achieved by providing a method of operating a runtime system to tune an execution performance based on a virtual architecture, in which the method may include generating a plurality of virtual architectures of a reconfigurable processor so that the virtual architectures correspond to an application, generating a plurality of binary files associated with the application, based on the generated virtual architectures, executing a part of each of the binary files in a virtual architecture corresponding to each of the binary files, and recording an execution performance of each of the binary files, and selecting a binary file with a highest execution performance from among the binary files, and executing a non-executed part of the selected binary file in a virtual architecture corresponding to the selected binary file.

The foregoing and/or other aspects may be achieved by providing a method of operating a runtime system to tune an execution performance based on a virtual architecture, in which the method may include generating a plurality of first virtual architectures of a reconfigurable processor so that the first virtual architectures correspond to a first application, generating a plurality of binary files associated with the first application, based on the first virtual architectures, acquiring virtual architecture information (VAI) of the first application, searching for, from prior knowledge, a second application with similar VAI corresponding to the acquired VAI, searching for a second virtual architecture used by the second application, selecting a virtual architecture with a highest similarity to the second virtual architecture, from among the first virtual architectures, and selecting a binary file corresponding to the selected virtual architecture.

The foregoing and/or other aspects may be achieved by providing a method of operating a multi-core system to perform a load balancing based on a virtual architecture, in which the multi-core system may include a plurality of reconfigurable processors with different physical architectures, and in which the method may include searching for a first reconfigurable processor in which an overload occurs, from among the reconfigurable processors, acquiring a virtual architecture corresponding to an application running in the first reconfigurable processor, searching for a second reconfigurable processor from among the reconfigurable processors, the second reconfigurable processor possibly including a physical architecture in which the acquired virtual architecture is contained as a subset, and enabling the application to migrate to the second reconfigurable processor, and performing the load balancing.

The foregoing and/or other aspects may be achieved by providing an apparatus for generating a virtual architecture of a reconfigurable processor so that the virtual architecture corresponds to an application, in which the apparatus may include an analyzing unit to analyze a requirement of the application, a requirement of a system, and a feature of the application, in which the system may enable an execution of the application, and a generating unit to generate the virtual architecture corresponding to the application, based on a physical architecture of the reconfigurable processor, the analyzed requirements and the analyzed feature.

The foregoing and/or other aspects may be achieved by providing a runtime system for tuning an execution performance based on a virtual architecture, in which the runtime system may include a generating unit to generate a plurality of virtual architectures of a reconfigurable processor so that the virtual architectures correspond to an application, a compiling unit to generate a plurality of binary files associated with the application, based on the generated virtual architectures, and a processing unit to execute a part of each of the binary files in a virtual architecture corresponding to each of the binary files, to record an execution performance of each of the binary files, to select a binary file with a highest execution performance from among the binary files, and to execute a non-executed part of the selected binary file in a virtual architecture corresponding to the selected binary file.

The foregoing and/or other aspects may be achieved by providing a runtime system for tuning an execution performance based on a virtual architecture, in which the runtime system may include a generating unit to generate a plurality of first virtual architectures of a reconfigurable processor so that the first virtual architectures correspond to a first application, a compiling unit to generate a plurality of binary files associated with the first application, based on the first virtual architectures, a processing unit to acquire VAI associated with the first application, to search for, from prior knowledge, a second application including similar VAI to the acquired VAI, to search for a second virtual architecture used by the second application, to select a virtual architecture with a highest similarity to the second virtual architecture, from among the first virtual architectures, and to select a binary file corresponding to the selected virtual architecture.

The foregoing and/or other aspects may be achieved by providing a multi-core system for performing a load balancing based on a virtual architecture, in which the multi-core system may include a plurality of reconfigurable processors with different physical architectures, the multi-core system including a first search unit to search for a first reconfigurable processor in which an overload occurs, from among the reconfigurable processors, a first processing unit to acquire a virtual architecture corresponding to an application running in the first reconfigurable processor, a second search unit to search for a second reconfigurable processor from among the reconfigurable processors, in which the second reconfigurable processor may include a physical architecture in which the acquired virtual architecture is contained as a subset, and a second processing unit to enable the application to migrate to the second reconfigurable processor, and to perform the load balancing.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 2 is a diagram of a configuration of a virtual architecture generating apparatus according to example embodiments;

FIG. 3 is a diagram of a virtual architecture according to example embodiments;

DETAILED DESCRIPTION

Figure 1:
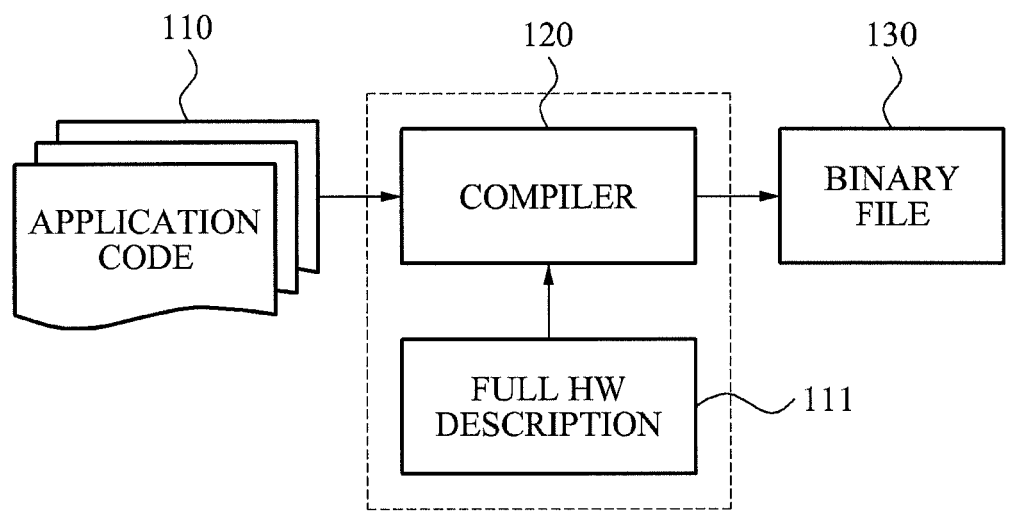
FIG. 1 is a diagram of an existing method of configuring an application in a conventional reconfigurable processor.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 2 is a diagram of a configuration of a virtual architecture generating apparatus 240 according to example embodiments.

Referring to FIG. 2, the virtual architecture generating apparatus 240 may generate a virtual architecture of a reconfigurable processor, so that the virtual architecture may correspond to an application. Accordingly, the virtual architecture generating apparatus 240 may search for a configuration of the reconfigurable processor that is suitable for the application, using a reconfiguration feature of the reconfigurable processor, and thus an overall performance of a system may be improved.

For example, the virtual architecture generating apparatus 240 may examine requirements 212, a feature of an application, a physical architecture 211 of the reconfigurable processor, and the like, and may search for a reconfiguration range of hardware of the reconfigurable processor based on the examined requirements 212, the examined feature, and the examined physical architecture 211. Here, the requirement 212 may include a requirement of the application, and a requirement of a system enabling execution of the application. Additionally, the virtual architecture generating apparatus 240 may generate a binary file 230 associated with the application, using the found reconfiguration range of hardware. Accordingly, the virtual architecture generating apparatus 240 may match the hardware to the application, unlike the conventional method in which an application needs to be matched to hardware.

To perform the above-described operations, the virtual architecture generating apparatus 240 may include an analyzing unit 241, and a generating unit 242.

The analyzing unit 241 may analyze the requirement of the system, and the requirement and feature of the application.

The requirement of the application may be derived in the form of a pragma from an application code 210 of the application. The requirement of the application may include, for example, a high performance, a low power, a response time, and the like.

The requirement of the system may include information collected during a run time. The requirement of the system may require disabling a predetermined portion of the hardware during the run time.

Additionally, the feature of the application may include, for example, a function used by the application, a data flow, a repeat count, and the like.

The generating unit 242 may generate a virtual architecture corresponding to the application, based on the physical architecture 211, the analyzed requirements and the analyzed feature. The generating unit 242 may generate the virtual architecture so that the virtual architecture may be contained as a subset in the physical architecture 211. Additionally, the generating unit 242 may generate a plurality of virtual architectures. In this instance, a runtime system that runs the application may select a virtual architecture with a best execution performance from among the plurality of virtual architectures, and may execute the application. The runtime system may select at least two virtual architectures from among the plurality of virtual architectures, and may simultaneously execute a plurality of applications. The runtime system will be further described later with reference to FIGS. 4A, 4B, and 7.

FIG. 3 is a diagram of a virtual architecture according to example embodiments.

Referring to FIG. 3, the generating unit 242 of the virtual architecture generating apparatus 240 may generate virtual architectures 310, 320, and 330 corresponding to an application 302, based on a requirement and a feature of the application 302, a requirement of a system, and a physical architecture 301 of a reconfigurable processor. The virtual architectures 310, 320, and 330 may have different configurations, for example hardware configurations, interconnection configurations, and the like, and accordingly may be different from each other in operation and performance.

For example, when the application 302 requires high performance, the virtual architecture generating apparatus 240 may generate a virtual architecture so that a maximum amount of resources may be used. Additionally, when the application 302 requires low power, the virtual architecture generating apparatus 240 may generate a virtual architecture so that a minimum amount of resources may be used through hardware sharing, and the like.

Accordingly, to generate a virtual architecture, the generating unit 242 may select hardware suitable for an application, or a combination of hardware, or may select interconnection between functional units (FUs) of the reconfigurable processor based on a data flow included in the feature of the application. Additionally, when a number of repeatedly used portions of the application is known, the generating unit 242 may change setting of the virtual architecture based on the known number.

Referring back to FIG. 2, the virtual architecture generating apparatus 240 may further include a compiling unit 220. The virtual architecture generating apparatus 240 may be physically separated from the compiling unit 220, as shown in FIG. 2. However, depending on embodiments, the virtual architecture generating apparatus 240 may be integrated with or separated from the compiling unit 220. For example, the virtual architecture generating apparatus 240 may be inserted as a module into the compiling unit 220.

The compiling unit 220 may compile the application code 210 based on virtual architecture-related information 243 associated with the virtual architecture generated by the generating unit 242.

Depending on embodiments, the compiling unit 220 may fail to compile the application code 210. In this instance, the generating unit 242 may regenerate a virtual architecture, by further using failure information regarding a failure of the compiling.

As described above, the virtual architecture generating apparatus 240 may generate a virtual architecture suitable for an application. Subsequently, a runtime system may tune an execution performance based on the generated virtual architecture. Hereinafter, the tuning operation will be described.

Figure 4A:
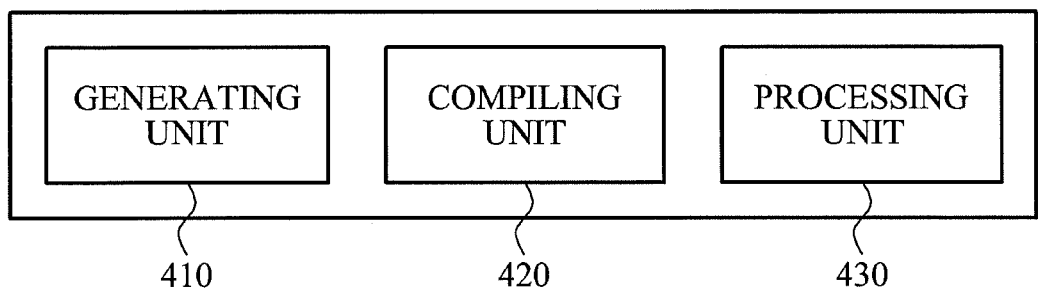
FIG. 4A is a block diagram of a configuration of a runtime system according to example embodiments.

FIG. 4A is a block diagram of a configuration of a runtime system 400 according to example embodiments.

Referring to FIG. 4A, the runtime system 400 may include, for example, a generating unit 410, a compiling unit 420, and a processing unit 430.

The generating unit 410 may generate a plurality of virtual architectures of a reconfigurable processor so that the virtual architectures may correspond to an application. The compiling unit 420 may generate a plurality of binary files associated with the application, based on the plurality of virtual architectures. The generating unit 410 and the compiling unit 420 may perform the same operations as the generating unit 242 and the compiling unit 220 of FIG. 2, and accordingly further descriptions thereof will be omitted.

When the virtual architectures and the binary files are generated, the processing unit 430 may select a virtual architecture-based binary file with a best execution performance. Accordingly, it is possible to tune the execution performance, thereby to improve the overall performance.

The processing unit 430 may execute a part of each of the binary files in a virtual architecture corresponding to each of the binary files, and may record an execution performance of each of the binary files. Specifically, the processing unit 430 may select a binary file from among the binary files, may execute a part of the selected binary file in a virtual architecture corresponding to the selected binary file, and may record an execution performance. Subsequently, the processing unit 430 may execute a part of each of the nonselected binary files in a corresponding virtual architecture, and may record execution performances.

When all execution performances of the binary files are recorded, the processing unit 430 may select a binary file with a best execution performance, namely a highest execution performance, from among the binary files. Additionally, the processing unit 430 may execute the other part, namely a non-executed part of the selected binary file, in the virtual architecture corresponding to the selected binary file.

Through the above-described operations, the runtime system 400 may perform sampling of the execution performance, based on the virtual architecture.

To tune the execution performance, the runtime system 400 may employ a different scheme from the sampling. In this instance, the runtime system 400 may select a virtual architecture-based binary file, using virtual architecture information (VAI). For example, assuming that two applications with similar VAI have similar performances, the runtime system 400 may use a result of selecting a virtual architecture-based binary file for a prior similar application. Hereinafter, an operation by which the runtime system 400 selects a binary file with a high performance for a first application will be described.

The generating unit 410 may generate a plurality of first virtual architectures of a reconfigurable processor, so that the first virtual architectures may correspond to the first application. Additionally, the compiling unit 420 may generate a plurality of binary files associated with the first application, based on the plurality of first virtual architectures. The generating unit 410 and the compiling unit 420 may perform the same operations as the generating unit 242 and the compiling unit 220 of FIG. 2, and accordingly further descriptions thereof will be omitted.

The processing unit 430 may acquire VAI of the first application.

Additionally, the processing unit 430 may search for, from prior knowledge, a second application with similar VAI to the acquired VAI. Specifically, the processing unit 430 may search for the second application with a VAI that is most similar to the VAI of the first application. Depending on embodiments, the processing unit 430 may compute a similarity, and may select an application including a VAI with a highest similarity.

When the second application is found, the processing unit 430 may search for a second virtual architecture used by the second application.

Additionally, the processing unit 430 may select a virtual architecture with a highest similarity to the found second virtual architecture, from among the first virtual architectures. For example, the processing unit 430 may compute a similarity between the second virtual architecture and each of the first virtual architectures, and may select a first virtual architecture with a highest similarity to the second virtual architecture.

When the virtual architecture with the highest similarity is selected, the processing unit 430 may select a binary file corresponding to the selected virtual architecture.

Through the above-described operations, the runtime system 400 may estimate the execution performance based on the virtual architecture.

As described above, the runtime system 400 may perform both the sampling and estimation, to tune the execution performance. Additionally, the sampling and estimation may be periodically repeated.

Figure 4B:
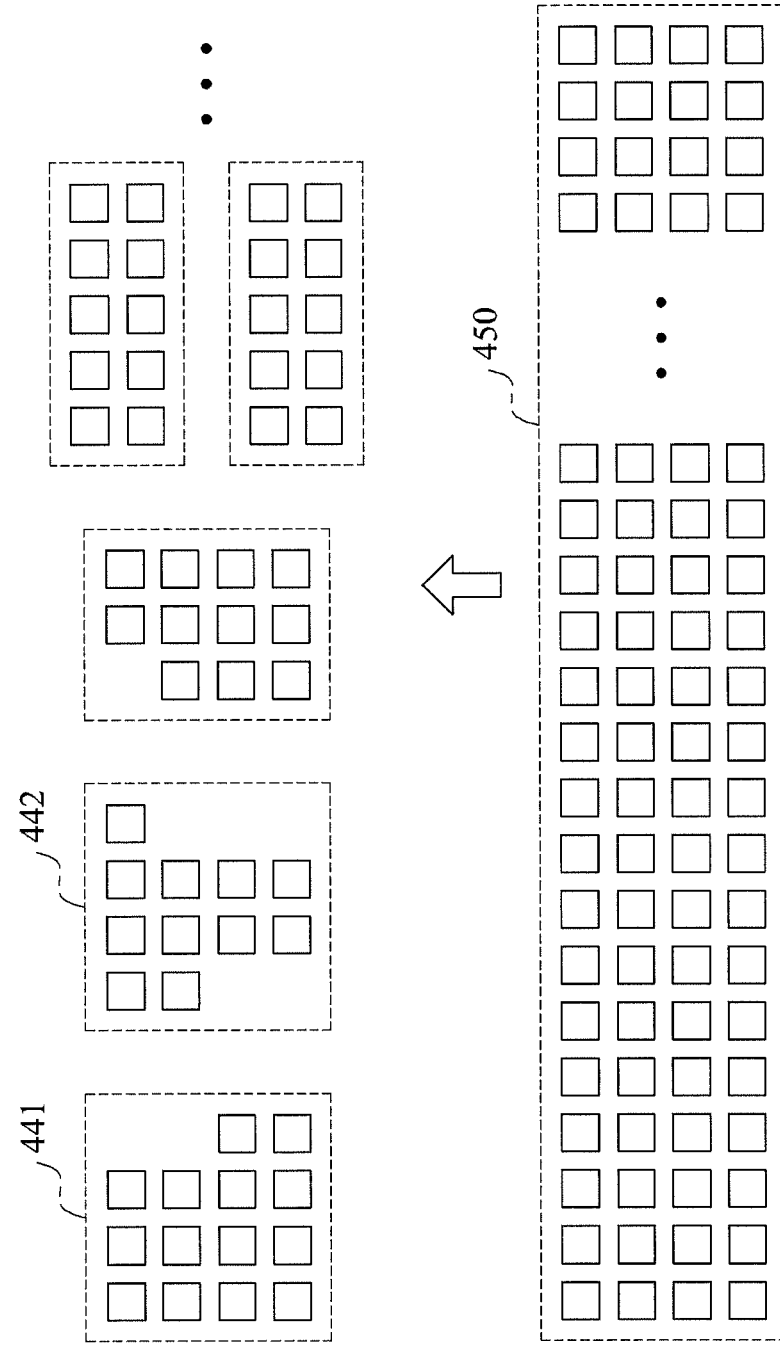
FIG. 4B is a diagram of a plurality of virtual architectures according to example embodiments.

FIG. 4B is a diagram of a plurality of virtual architectures according to example embodiments.

The runtime system 400 may generate a plurality of virtual architectures, and may simultaneously execute a plurality of applications in the generated virtual architectures.

Referring to FIG. 4B, the generating unit 410 may generate a first virtual architecture 441, and a second virtual architecture 442 that respectively correspond to the first application, and the second application. In this instance, the first virtual architecture 441 and the second virtual architecture 442 may be generated so that a physical architecture 450 may be prevented from being shared between the first virtual architecture 441 and the second virtual architecture 442.

The compiling unit 420 may generate a first binary file associated with the first application, based on the first virtual architecture 441, and generate a second binary file associated with the second application, based on the second virtual architecture 442.

The processing unit 430 may execute the first binary file in the first virtual architecture 441, and execute the second binary file in the second virtual architecture 442. Since there is no common physical architecture between the first virtual architecture 441 and the second virtual architecture 442, the processing unit 430 may simultaneously execute the first application and the second application in the first virtual architecture 441 and the second virtual architecture 442. Accordingly, the runtime system 400 may partition resources and use the partitioned resources, which may be called a "resource partitioning technique."

Figure 5:
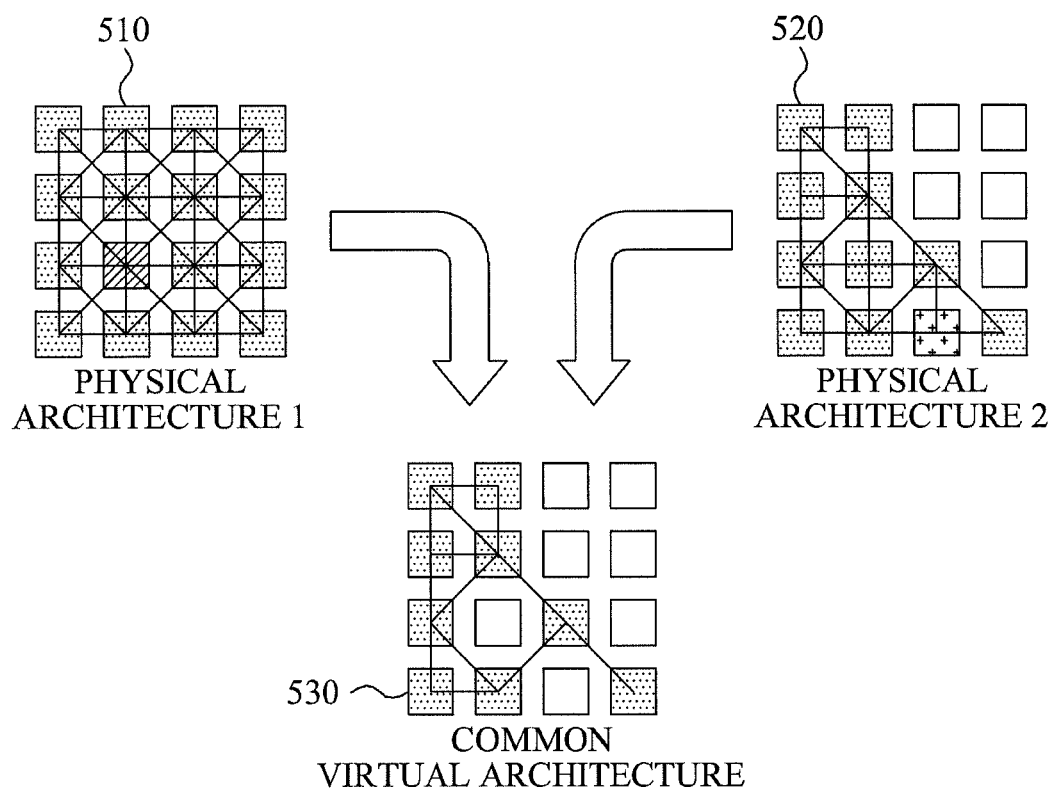
FIG. 5 is a diagram of a common virtual architecture for a plurality of reconfigurable processors with different physical architectures according to example embodiments.

FIG. 5 is a diagram of a common virtual architecture for a plurality of reconfigurable processors with different physical architectures according to example embodiments.

Referring to FIG. 5, a multi-core system may include a plurality of reconfigurable processors with different physical architectures. For example, a first reconfigurable processor 510 and a second reconfigurable processor 520 may be included in the multi-core system, and may have different physical architectures.

The multi-core system may derive a common virtual architecture 530 from the first reconfigurable processor 510 and second reconfigurable processor 520. For example, when an application has the common virtual architecture 530, or has a virtual architecture as a subset of the common virtual architecture 530, the application may be operated in both the first reconfigurable processor 510 and the second reconfigurable processor 520. Accordingly, a heterogeneous multi-core system including the first reconfigurable processor 510 and the second reconfigurable processor 520 may perform load balancing through migration of the application during a dynamic period. Hereinafter, an operation by which the multi-core system performs load balancing will be described with reference to FIG. 6.

Figure 6:
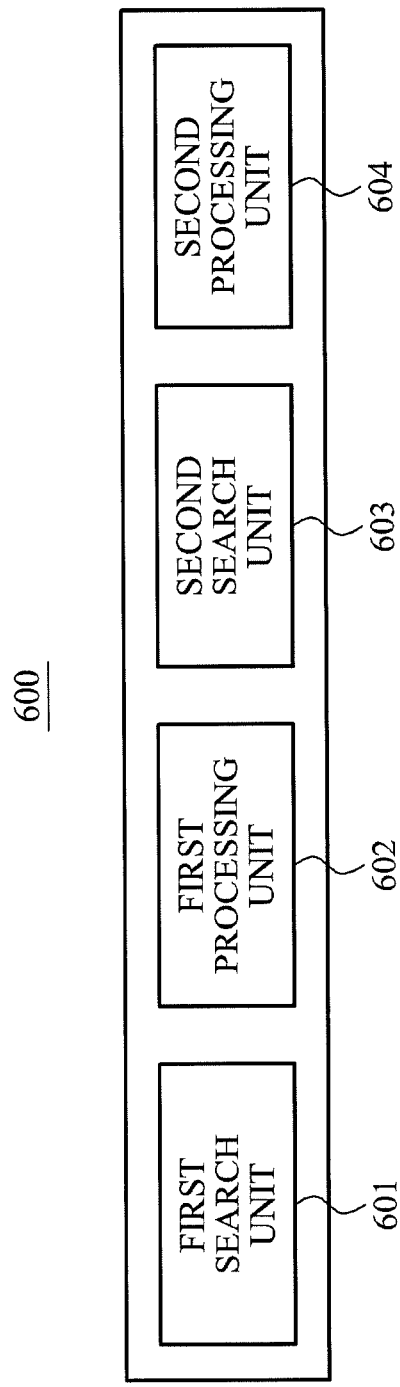
FIG. 6 is a block diagram of a configuration of a multi-core system according to example embodiments.

FIG. 6 is a block diagram of a configuration of a multi-core system 600 according to example embodiments.

Referring to FIG. 6, the multi-core system 600 may include a plurality of reconfigurable processors with different physical architectures. Additionally, the multi-core system 600 may perform load balancing based on a virtual architecture.

To perform the load balancing, the multi-core system 600 may include, for example, a first search unit 601, a first processing unit 602, a second search unit 603, and a second processing unit 604.

The first search unit 601 may search for a first reconfigurable processor in which an overload occurs, from among the reconfigurable processors.

The first processing unit 602 may acquire a virtual architecture corresponding to an application running in the first reconfigurable processor.

When the virtual architecture is acquired, the second search unit 603 may search for a second reconfigurable processor to which the application is enabled to migrate, from among the reconfigurable processors. In this instance, a processor with a physical architecture that contains, as a subset, a virtual architecture of the application may be found as a result of the searching by the second search unit 603.

When the second reconfigurable processor is found, the second processing unit 604 may enable the application to migrate to the found second reconfigurable processor, and may perform the load balancing.

Depending on embodiments, a plurality of second reconfigurable processors to which an application is to migrate may be found. In this instance, the second search unit 603 may search for a reconfigurable processor with a smallest load, from among the found second reconfigurable processors. Additionally, when the reconfigurable processor with the smallest load is found, the second processing unit 604 may enable the application to migrate to the found reconfigurable processor, and may perform the load balancing.

Figure 7:
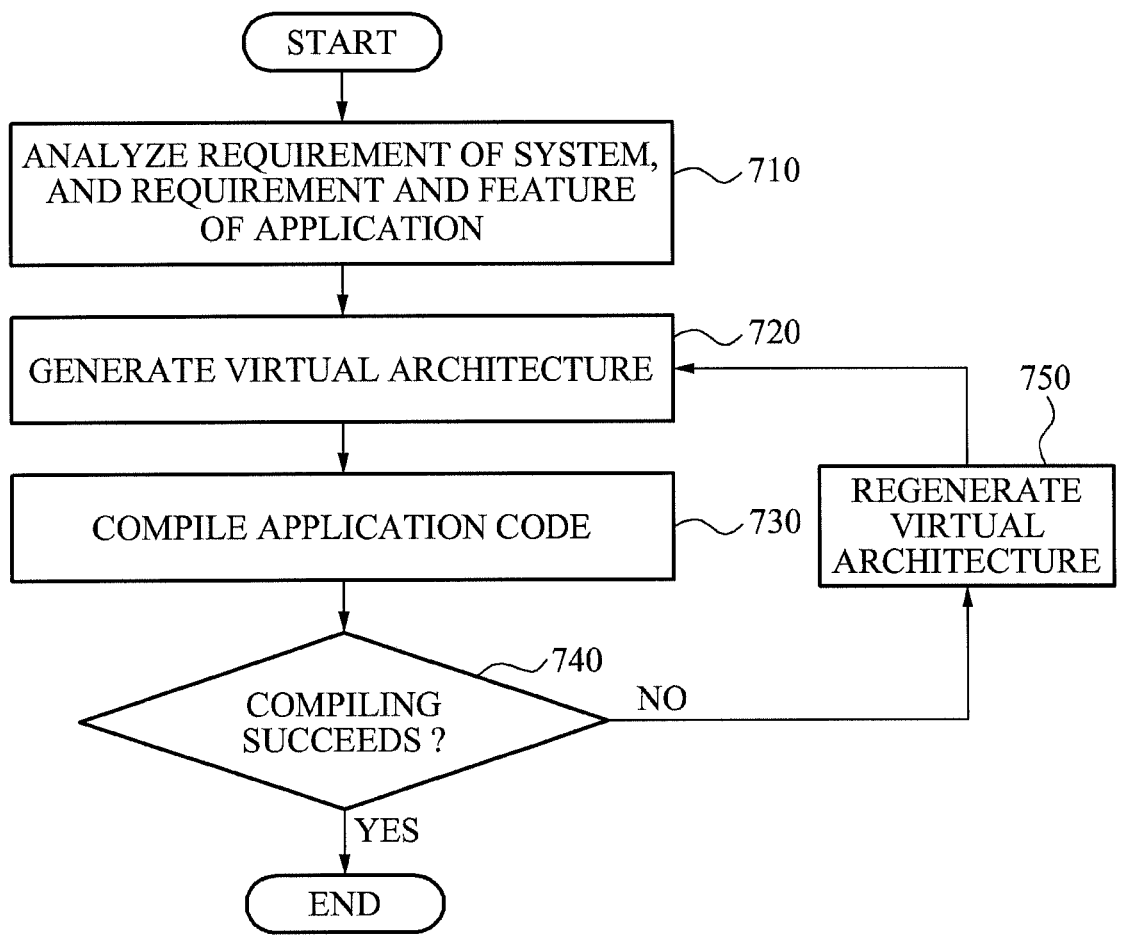
FIG. 7 is a flowchart of a method of generating a virtual architecture according to example embodiments.

FIG. 7 is a flowchart of a method of generating a virtual architecture according to example embodiments.

In the method of FIG. 7, a virtual architecture of a reconfigurable processor may be generated so that the virtual architecture may correspond to an application. Accordingly, a configuration of the reconfigurable processor that is suitable for the application may be found using a reconfiguration feature of the reconfigurable processor, and thus an overall performance of a system may be improved.

For example, a requirement of an application, a feature of the application, a requirement of a system enabling execution of the application, a physical architecture of the reconfigurable processor, and the like may be examined. Additionally, a reconfiguration range of hardware of the reconfigurable processor may be searched for based on the examined requirements, the examined feature, and the examined physical architecture. Additionally, a binary file associated with the application may be generated, using the found reconfiguration range of hardware. Accordingly, the method of FIG. 7 may enable the hardware to be matched to the application, unlike the conventional method in which an application needs to be matched to hardware.

Referring to FIG. 7, in operation 701, the requirement of the system, and the requirement and feature of the application may be analyzed.

The requirement of the application may be derived in the form of pragma from an application code of the application. The requirement of the application may include, for example, a high performance, a low power, a response time, and the like.

The requirement of the system may include information collected during a run time. The requirement of the system may require disabling a predetermined portion of hardware during the run time.

Additionally, the feature of the application may include, for example, a function used by the application, a data flow, a repeat count, and the like.

In operation 720, a virtual architecture corresponding to the application may be generated based on a physical architecture of the reconfigurable processor, the analyzed requirements and the analyzed feature. In this instance, the virtual architecture may be generated to be contained as a subset in the physical architecture. Additionally, a plurality of virtual architectures may be generated. In this instance, a runtime system that runs the application may select a virtual architecture with a best execution performance from among the plurality of virtual architectures, and may execute the application.

In operation 730, the application code may be compiled based on virtual architecture-related information. In operation 740, whether the compiling of the application code succeeds may be determined. When the compiling fails, the virtual architecture may be regenerated, by further using failure information regarding a failure of the compiling in operation 750.

As described above, using the method of FIG. 7, a virtual architecture suitable for an application may be generated. Hereinafter, an operation by which a runtime system tunes an execution performance based on the generated virtual architecture will be described.

Figure 8:
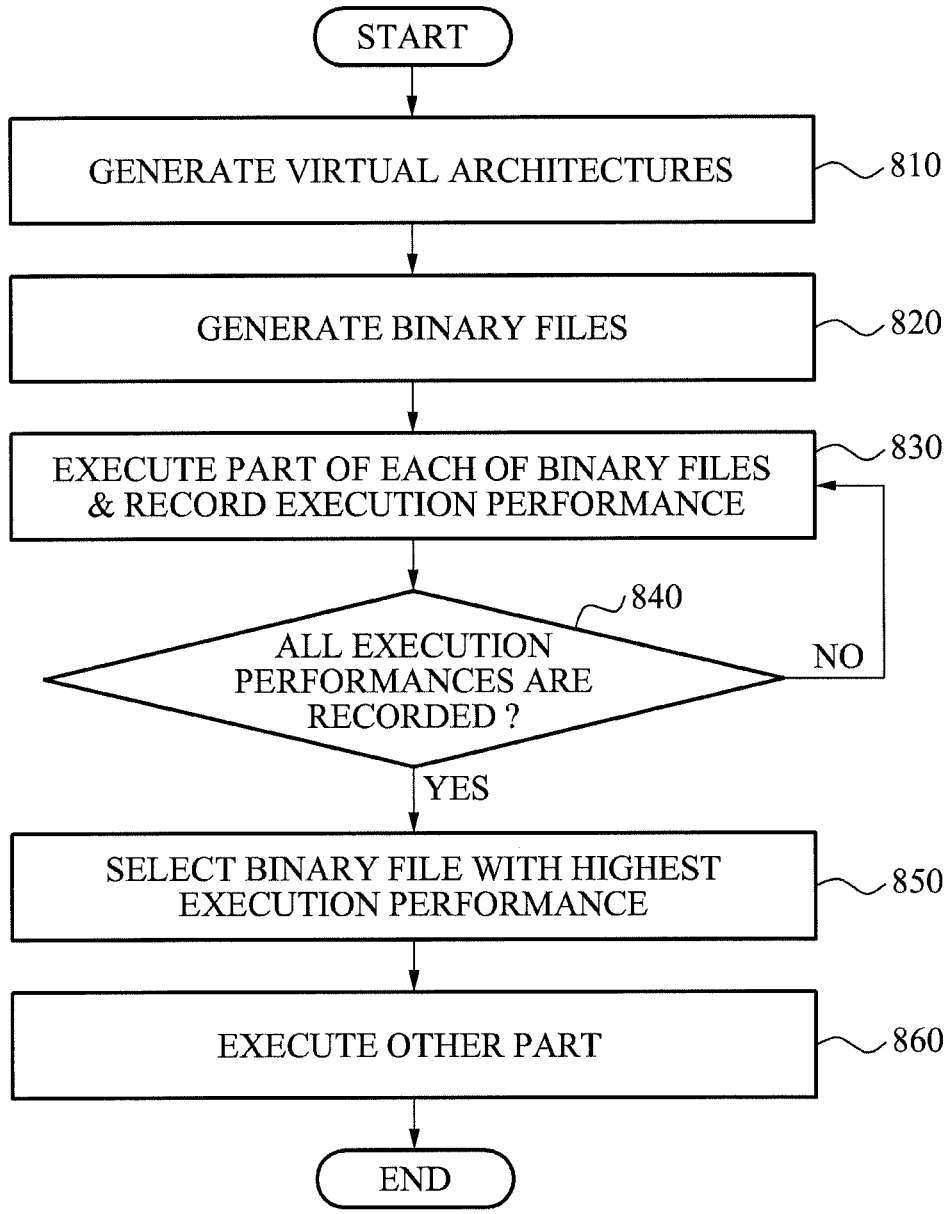
FIG. 8 is a flowchart of a method of operating a runtime system to perform sampling of an execution performance based on a virtual architecture according to example embodiments.

FIG. 8 is a flowchart of a method of operating a runtime system to perform sampling of an execution performance based on a virtual architecture according to example embodiments.

Referring to FIG. 8, in operation 810, a plurality of virtual architectures of a reconfigurable processor may be generated so that the virtual architectures may correspond to an application. In operation 820, a plurality of binary files associated with the application may be generated based on the plurality of virtual architectures.

When the virtual architectures and the binary files are generated, a virtual architecture-based binary file with a best execution performance may be selected. Accordingly, it is possible to tune the execution performance thereby to improve the overall performance.

In operation 830, a part of each of the binary files may be executed in a virtual architecture corresponding to each of the binary files, and an execution performance of each of the binary files may be recorded. Specifically, a binary file may be selected from among the binary files, a part of the selected binary file may be executed in a virtual architecture corresponding to the selected binary file, and an execution performance may be recorded. In operation 840, a part of each of the non-selected binary files may be executed in a corresponding virtual architecture, and execution performances may be recorded.

When all execution performances of the binary files are recorded, a binary file with a highest execution performance may be selected from among the binary files in operation 850. In operation 860, the other part, namely a non-executed part of the selected binary file, may be executed in the virtual architecture corresponding to the selected binary file.

By operations 810 through 860, sampling of the execution performance may be performed based on the virtual architecture.

Figure 9:
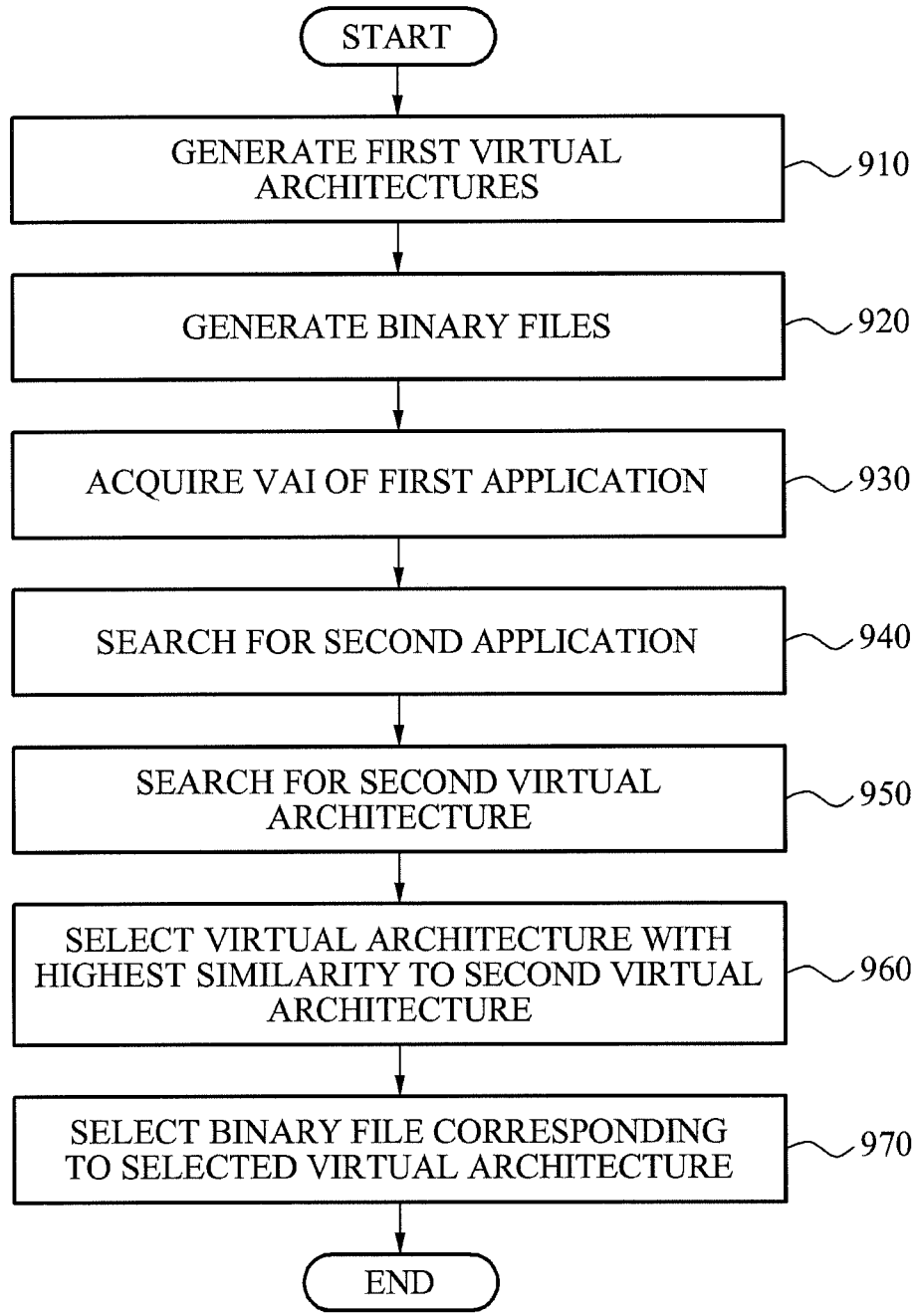
FIG. 9 is a flowchart of a method of operating a runtime system to estimate an execution performance based on a virtual architecture according to example embodiments.

FIG. 9 is a flowchart of a method of operating a runtime system to estimate an execution performance based on a virtual architecture according to example embodiments.

In the method of FIG. 9, a virtual architecture-based binary file may be selected using VAI. For example, assuming that two applications with similar VAI have similar performances, a result of selecting a virtual architecture-based binary file for a prior similar application may be used. Hereinafter, an operation of selecting a binary file with a high performance for a first application will be described.

In operation 910, a plurality of first virtual architectures of a reconfigurable processor may be generated so that the first virtual architectures may correspond to a first application. In operation 920, a plurality of binary files associated with the first application may be generated based on the plurality of first virtual architectures.

In operation 930, VAI of the first application may be acquired.

In operation 940, a second application with similar VAI to the acquired VAI may be searched for from prior knowledge. Specifically, the second application with the most similar VAI to the VAI of the first application may be searched for. Depending on embodiments, a similarity may be computed, and an application including VAI with a highest similarity may be selected.

When the second application is found, a second virtual architecture used by the second application may be searched for in operation 950.

In operation 960, a virtual architecture with a highest similarity to the found second virtual architecture may be selected from among the first virtual architectures. For example, a similarity between the second virtual architecture and each of the first virtual architectures may be computed, and a first virtual architecture with a highest similarity to the second virtual architecture may be selected.

When the virtual architecture with the highest similarity is selected, a binary file corresponding to the selected virtual architecture may be selected in operation 970.

By operations 910 through 970, the execution performance may be estimated based on the virtual architecture.

Depending on embodiments, a plurality of virtual architectures may be generated, and a plurality of applications may be simultaneously executed in the generated virtual architectures.

For example, a first virtual architecture, and a second virtual architecture that respectively correspond to a first application, and a second application may be generated. In this instance, the first virtual architecture and the second virtual architecture may be generated so that a physical architecture may be prevented from being shared between the first virtual architecture and the second virtual architecture.

Additionally, a first binary file associated with the first application may be generated based on the first virtual architecture, and a second binary file associated with the second application may be generated based on the second virtual architecture.

The first binary file, and the second binary file may be executed in the first virtual architecture, and in the second virtual architecture, respectively. Since there is no common physical architecture between the first virtual architecture and the second virtual architecture, the first application and the second application may be simultaneously executed in the first virtual architecture and the second virtual architecture. Accordingly, the runtime system may partition resources and use the partitioned resources, which may be called a "resource partitioning technique."

Figure 10:
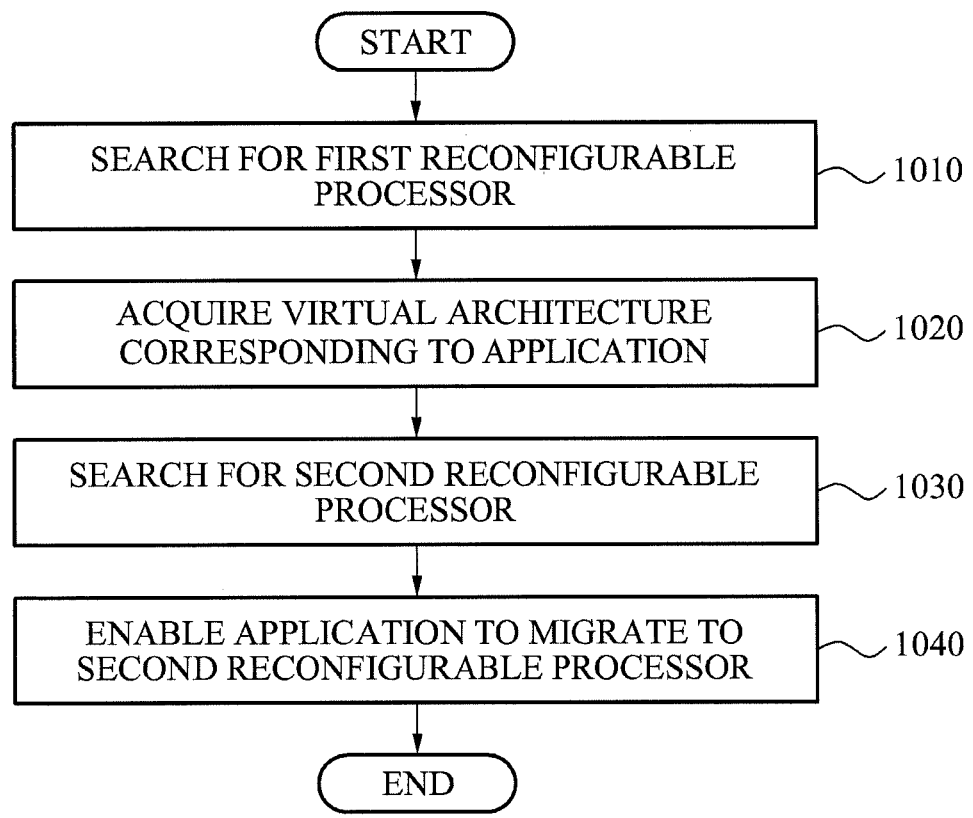
FIG. 10 is a flowchart of a method of operating a multi-core system to perform load balancing according to example embodiments.

FIG. 10 is a flowchart of a method of operating a multi-core system to perform load balancing according to example embodiments.

In the method of FIG. 10, the multi-core system may include a plurality of reconfigurable processors with different physical architectures. In this instance, the load balancing may be performed based on a virtual architecture.

To perform the load balancing, a first reconfigurable processor in which an overload occurs may be searched for from among the reconfigurable processors in operation 1010.

In operation 1020, a virtual architecture corresponding to an application running in the first reconfigurable processor may be acquired.

When the virtual architecture is acquired, a second reconfigurable processor to which the application is enabled to migrate may be searched for from among the reconfigurable processors in operation 1030. In this instance, a processor with a physical architecture that contains, as a subset, a virtual architecture of the application may be found as a result of the searching.

When the second reconfigurable processor is found, the application may be enabled to migrate to the found second reconfigurable processor, and the load balancing may be performed in operation 1040.

Depending on embodiments, a plurality of second reconfigurable processors to which an application is to migrate may be found. In this instance, a reconfigurable processor with a smallest load may be searched for from among the found second reconfigurable processors. When the reconfigurable processor with the smallest load is found, the application may be enabled to migrate to the found reconfigurable processor, and the load balancing may be performed.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus operating with a processor, the apparatus comprising:
    an analyzing unit configured to analyze, by the processor, a requirement of an application, a requirement of a system which enables execution of the application, and a feature of the application;
    a generating unit configured to generate, by the processor, a virtual architecture of a reconfigurable processor based on a physical architecture of the reconfigurable processor, the requirement of the application, the requirement of the system, and the feature of the application, so that the virtual architecture corresponds to the application; and
    a compiling unit configured to compile, by the processor, an application code of the application based on the virtual architecture,
    wherein the virtual architecture comprises functional units of the reconfigurable processor and interconnections between the functional units of the reconfigurable processor,
    wherein the generating unit is further configured to generate the virtual architecture to be contained as a subset in the physical architecture of the reconfigurable processor, and
    wherein the generating unit is further configured to regenerate, by the processor, the virtual architecture upon determining that the compiling unit fails to compile the application code.

2. The apparatus of claim 1, wherein the requirement of the application comprises performance, power, and a response time.

3. The apparatus of claim 1, wherein the requirement of the system comprises disabling a predetermined portion of hardware of the reconfigurable processor during a run time.

4. The apparatus of claim 1, wherein the feature of the application comprises a function used by the application, data flow in the application, and a repeatedly used portion in the application.

5. The apparatus of claim 1, wherein the generating unit is further configured to:
    search, by the processor, for functional units and interconnections required by the application, from the functional units of the reconfigurable processor and the interconnections between the functional units of the reconfigurable processor, and
    generate the virtual architecture to include the functional units and the interconnections required by the application.

6. The apparatus of claim 1, wherein the generating unit is further configured to regenerate the virtual architecture based on failure information regarding a failure of compiling of the application code.

7. The apparatus of claim 1, wherein the generating unit is further configured to generate, by the processor, a plurality of virtual architectures of which each corresponds to the application, and
wherein the apparatus further comprises:
a processing unit configured to select, by the processor, a virtual architecture with best execution performance from among the plurality of virtual architectures.

8. An apparatus operating with a processor, the apparatus comprising:
an analyzing unit configured to analyze, by the processor, a requirement of an application, a requirement of a system which enables execution of the application, and a feature of the application;
a generating unit configured to generate, by the processor, a plurality of virtual architectures of a reconfigurable processor based on a physical architecture of the reconfigurable processor, the requirement of the application, the requirement of the system, and the feature of the application, so that each of the plurality of virtual architectures corresponds to the application;
a compiling unit configured to generate, by the processor, a plurality of binary files for the application based on the plurality of virtual architectures respectively; and
a processing unit configured to execute, by the processor, a first part of each of the plurality of binary files in a virtual architecture which corresponds to a respective binary file from among the plurality of virtual architectures,
wherein each of the plurality of virtual architectures is contained as a subset in the physical architecture of the reconfigurable processor,
wherein the processing unit is further configured to record, by the processor, execution performance for each of the plurality of binary files, and select, by the processor, a binary file with highest execution performance from among the plurality of binary files,
wherein the processing unit is further configured to execute, by the processor, a second part of the selected binary file in a virtual architecture which corresponds to the selected binary file from among the plurality of virtual architectures, and
wherein the second part corresponds to a part of the selected binary file which is not executed during executing the first part of the selected binary file.

9. The apparatus of claim 8, wherein:
each of the plurality of virtual architectures comprises functional units of the reconfigurable processor and interconnections between the functional units of the reconfigurable processor, and
the plurality of virtual architectures include different functional units and interconnections from one another.

10. The apparatus of claim 9, wherein each of the plurality of virtual architectures comprises functional units and interconnections, which are required by the application and are selected from the functional units of the reconfigurable processor and the interconnections between the functional units of the reconfigurable processor.

11. An apparatus operating with a processor, the apparatus comprising:
an analyzing unit configured to analyze, by the processor, a requirement of a first application, a requirement of a second application, a requirement of a system which enables execution of the first and second applications, a feature of the first application, and a feature of the second application; and
a generating unit configured to:
generate, by the processor, a first virtual architecture of a reconfigurable processor based on a physical architecture of the reconfigurable processor, the requirement of the first application, the requirement of the system, and the feature of the first application, so that the first virtual architecture corresponds to the first application, and
generate, by the processor, a second virtual architecture of the reconfigurable processor based on the physical architecture of the reconfigurable processor, the requirement of the second application, the requirement of the system, and the feature of the second application, so that the second virtual architecture corresponds to the second application,
wherein each of the first and second virtual architectures comprises functional units of the reconfigurable processor and interconnections between the functional units of the reconfigurable processor,
wherein the first and second virtual architectures include functional units and interconnections which are required by the first and second applications respectively, and
wherein the generating unit is further configured to generate the first and second virtual architectures so that the physical architecture of the reconfigurable processor is prevented from being shared between the first and second virtual architectures.

12. The apparatus of claim 11, wherein each of the first and second virtual architecture is contained as a subset in the physical architecture of the reconfigurable processor.

13. The apparatus of claim 11, further comprising:
a compiling unit configured to:
generate, by the processor, a first binary file for the first application based on the first virtual architecture, and
generate, by the processor, a second binary file for the second application based on the second virtual architecture.

14. The apparatus of claim 13, further comprising:
a processing unit configured to simultaneously execute, by the processor, the first and second binary files in the first and second virtual architectures respectively.

* * * * *